United States Patent
Lee (12)

(10) Patent No.: US 6,483,273 B1
(45) Date of Patent: Nov. 19, 2002

(54) AC-POWERED RECHARGING DEVICE FOR CIGARETTE LIGHTER-ADAPTED RECHARGEABLE APPLIANCES

(75) Inventor: Martin Lee, Wilson, WY (US)

(73) Assignee: Conwave, Inc., Jackson, WY (US)

( * ) Notice: Subject to any disclaimer, the term of this patent is extended or adjusted under 35 U.S.C. 154(b) by 0 days.

(21) Appl. No.: 09/790,137

(22) Filed: Feb. 21, 2001

(51) Int. Cl.⁷ .............................................. H01M 10/46
(52) U.S. Cl. ....................................... 320/111; 320/114
(58) Field of Search ................................ 320/107, 111, 320/112, 114, 115

(56) References Cited

U.S. PATENT DOCUMENTS 5,510,691 A    4/1996   Palatov
5,844,472 A    12/1998  Lee
5,847,545 A  * 12/1998  Chen et al. .................. 320/138
5,883,494 A  *  3/1999  Kobayashi et al. ......... 320/115

* cited by examiner

*Primary Examiner*—Edward H. Tso
(74) *Attorney, Agent, or Firm*—Morriss, Bateman, O'Bryant & Compagni

(57) ABSTRACT

An AC-powered charging/recharging device is structured with a charging port sized to receive the cigarette lighter-adapted (DC) end, of an appliance, such as a flashlight or shaver, or a DC charger adapter for an electronic device, to enable use or recharging of such adapted appliances from an AC power source. The charging port of the charging/recharging device is particularly oriented within the charging/recharging device to prevent dislodgement of the appliance from the charging port and to prevent dislodgement of the charging/recharging device from an AC power source, such as a wall outlet.

15 Claims, 6 Drawing Sheets

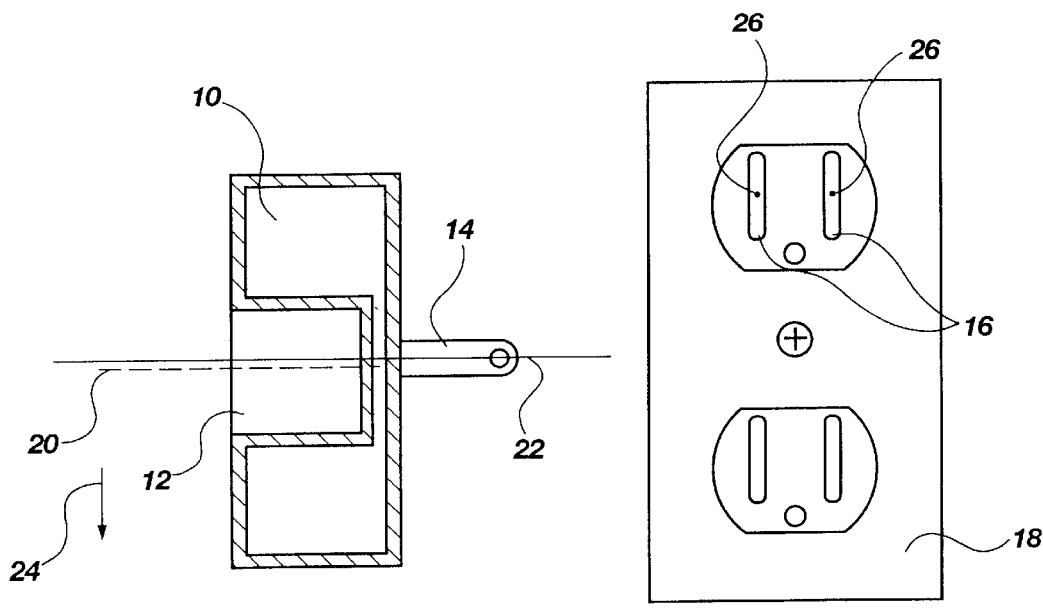
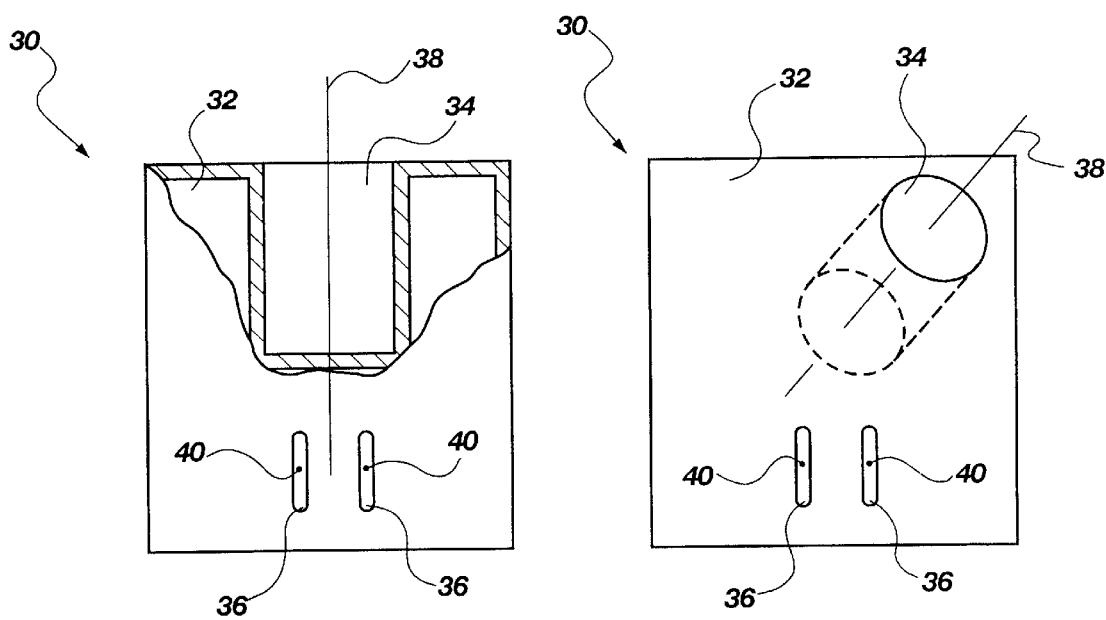
Fig. 1
(PRIOR ART)
Fig. 2          Fig. 3

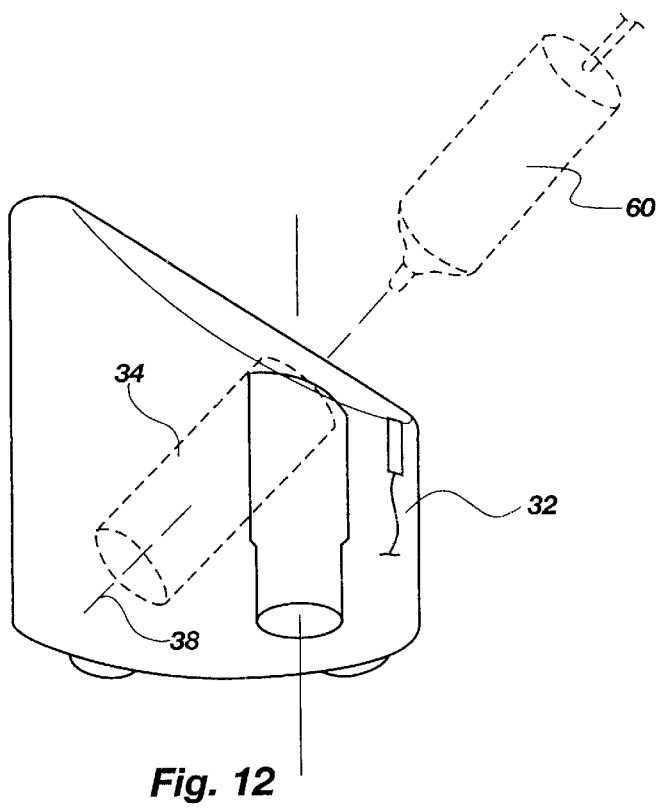
Fig. 12
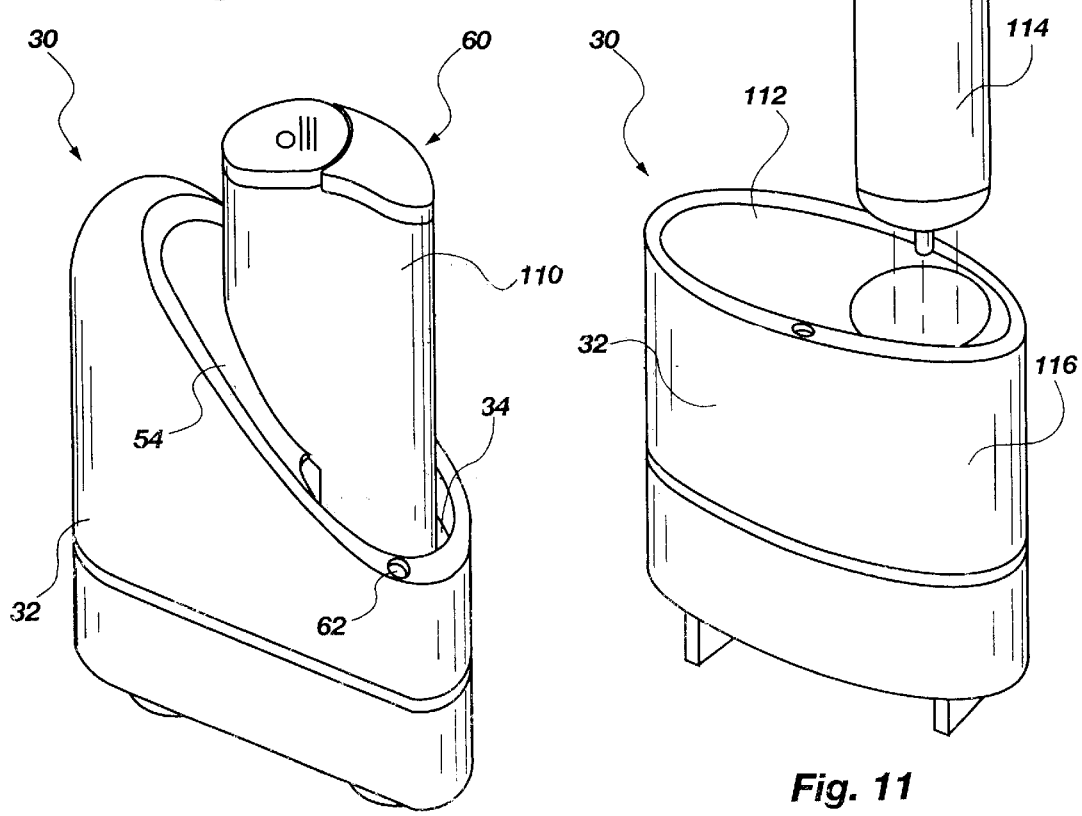
Fig. 10
Fig. 11

AC-POWERED RECHARGING DEVICE FOR CIGARETTE LIGHTER-ADAPTED RECHARGEABLE APPLIANCES

BACKGROUND OF THE INVENTION

1. Field of the Invention

This invention relates to devices constructed for charging rechargeable electronic devices or appliances and the like which are structured for insertion in a cigarette lighter of a vehicle, and specifically relates to an AC-powered recharging device configured to securely engage a rechargeable electronic appliance or device.

2. Description of Related Art

Many electronic appliances or devices typically used in homes or offices have been adapted for use in vehicles, boats and other forms of transportation by adapting such appliances to be powered from the cigarette lighter of a vehicle or boat. Such electronic appliances include telephones, compact disc players, televisions, vacuums and computers. These appliances have been adapted for use in vehicles and the like by replacing the typical electrical prongs insertable in an AC outlet with a shaft portion (DC plug) sized to be received in the cigarette lighter. The electronic appliance is then powered by the battery or engine of the car. Some devices which have been adapted for use in a vehicle may not only be powered by the battery of the vehicle, but may be rechargeable by the battery to provide wireless use. Such devices typically include mobile telephones, flashlights and shavers.

It is sometimes desirable or necessary to use in the home or office electronic devices which have been adapted for use or recharging in a vehicle. It may also be necessary or desirable to recharge such electronic appliances in a home or office for use there. However, once configured with an adaptor for insertion in a cigarette lighter, such appliances are virtually unusable anywhere outside of or away from the vehicle. Thus, voltage adaptors and/or recharging devices have been developed for providing power to cigarette lighter-adapted devices using an AC power outlet. Examples of such devices are generally disclosed in U.S. Pat. No. 5,510,691 to Palatov and U.S. Pat. No. 5,844,472 to Lee.

The devices disclosed in the referenced patents are notable in having a docking aperture in the recharging unit the axis of which is oriented parallel to, or coaxially with, the dual male openings of the wall socket into which the prongs of the recharging unit are plugged. As a result, any electronic appliance plugged into known recharging devices can slip out, be pulled out or be knocked out of the recharging device if, for example, a human or animal brushes past the recharging device. Moreover, the inherent weight and/or center of gravity of the rechargeable device, such as a heavier weight flashlight or shaver, will cause the recharging adapter unit to fall out of the wall socket due to gravitational pull of the appliance on the adapter unit. Known recharging units then become either ineffective or useless.

Thus, it would be advantageous in the art to provide a charging/recharging device which is configured to receive a cigarette lighter-adapted electronic appliance into a charging port which is oriented in a manner which will lessen or prevent the charging/recharging device from being dislodged from a wall socket or other power source and which is structured to prevent dislodgment of the electronic appliance from the charging/recharging device.

BRIEF SUMMARY OF THE INVENTION

In accordance with the present invention, an AC-powered recharging device is structured to receive a cigarette lighter-adapted electronic appliance and to maintain such appliance in an orientation which prevents dislodgement of the appliance from the recharging device and which prevents dislodgement of the recharging device from an AC wall socket or power source. The invention disclosed herein is adaptable for use in charging, or supplying electricity to, an appliance which is otherwise usable only in the cigarette lighter of a vehicle or boat or an appliance which itself has an charging adapter fitted with a DC plug for recharging the appliance via the cigarette lighter of a vehicle. The present invention is also adaptable for use in recharging an appliance which is structured with rechargeable battery means. However, for the sake of simplicity, the invention is described herein as being a recharging device for use with rechargeable appliances.

The recharging device of the present invention generally comprises a housing structured with a charging port which is sized to receive the cylindrical post, or DC plug, of an electronic appliance, or its charger, which is adapted for insertion into the cigarette lighter of a vehicle. The housing is also structured to enclose the electrical circuitry of the recharging device, which provides power derived from an AC power source to the cigarette lighter-adapted appliance or its charger.

The housing of the present invention is structured to provide a charging port, the longitudinal axis of which is oriented away from a defined axis extending through the prong-receiving openings of an AC power source or wall socket. Understandably, the same defined axis is associated with the prongs of the recharging device of the present invention which are adapted for insertion in a wall socket or other AC power source. Hence, the longitudinal axis of the charging port is likewise oriented away from the longitudinal axis of the prongs of the recharging device when in position for insertion in an outlet or power source.

The longitudinal axis of the charging port may preferably be oriented radially to the defined axis of the AC power source and prongs. In a particularly suitable embodiment of the invention, the charging port is radially oriented to the defined axis of the prongs and is oriented in a substantially vertical orientation. However, the charging port may be other than vertically-oriented (i.e., oriented at an angle to the defined axis of the prongs). The orientation of the charging port as described positions the weight and/or center of gravity of the rechargeable appliance in a manner which prevents the recharging device of the present invention from being pulled away from the wall socket or other power source due to gravitational pull, and also prevents the rechargeable appliance from becoming dislodged from the housing.

BRIEF DESCRIPTION OF THE SEVERAL VIEWS OF THE DRAWINGS

In the drawings, which illustrate what is currently considered to be the best mode for carrying out the invention:

FIG. 1 is a side view in cross section of a representational recharging device of the prior art illustrating the orientation of the docking port in relationship to the axis of the prongs of the device which are insertable into a wall outlet, which is also shown;

FIG. 2 is an elevational view in partial phantom of a representational illustration of a first embodiment of the present invention showing the orientation of the charging port relative to a defined axis of the prongs of the invention;

FIG. 3 is an elevational view in cross section of a representational illustration of a second embodiment of the present invention showing the orientation of the charging port relative to a defined axis of the prongs of the invention;

FIG. 10 is a perspective view of the embodiment shown in FIG. 4 in which a rechargeable flashlight is shown positioned in the charging port;

FIG. 11 is a perspective view of a fourth embodiment of the invention illustrating an alternative design of the housing;

FIG. 12 is a side view in cross section of the embodiment of the invention shown in FIG. 10, illustrating alternative orientations of the charging port.

DETAILED DESCRIPTION OF THE INVENTION

Figure 4:
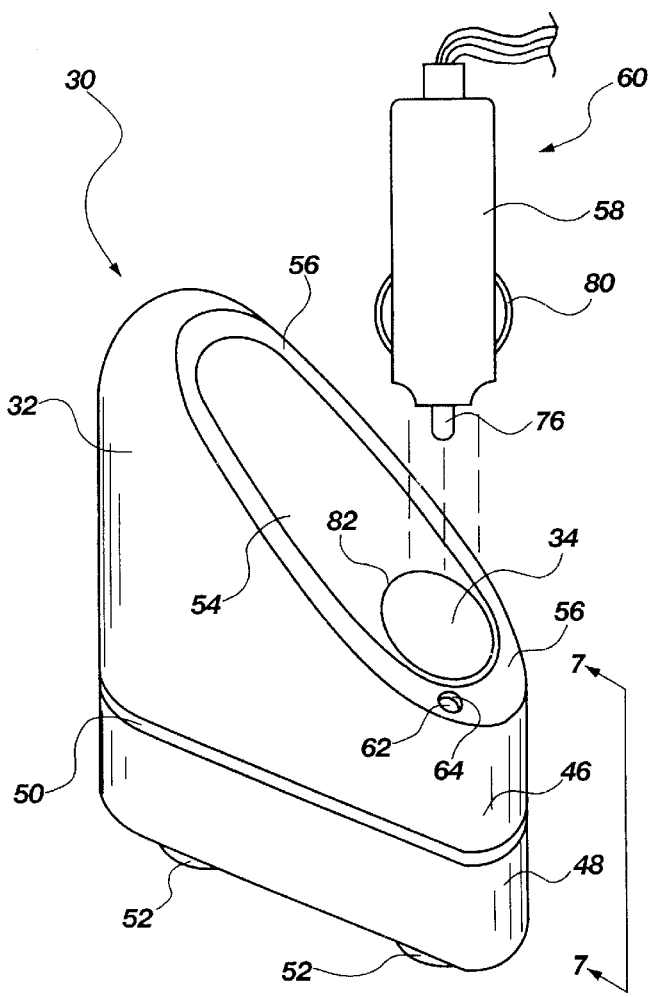
FIG. 4 is a perspective view of a third embodiment of the invention illustrating an ornamentally stylized housing.

FIG. 1 illustrates in a representational manner the configuration of known recharging devices which are structured to employ AC power to recharge a cigarette lighter-adapted rechargeable device. Specifically, known recharging devices comprise a housing member 10 configured with a docking port 12 into which a rechargeable device (not shown) is positioned for recharging. The housing member 10 is further structured with a pair of prongs 14 (only one being viewable from the side view shown) which are positionable in the dual openings 16 of a conventional wall socket 18 or other power source. It can be seen that in known recharging devices, the docking port 12 has a longitudinal axis 20 extending through the length thereof which is parallel to a defined axis 22 extending through the prongs 14 of the device. Because the prongs 14 of the device are positionable in the dual openings 16 of an electrical outlet, the defined axis 22 of the prongs 14 is coaxial or coextensive with a defined axis 26 extending into the dual openings 16 of the outlet. Thus, the defined axis 26 of the dual openings 16 of the outlet, as illustrated in FIG. 1, would extend into the paper (perpendicular to the plane of the paper) and the defined axis 24 of the prongs would likewise extend into the paper if the representational housing member 10 were rotated ninety degrees to the right thereby orienting the prongs for insertion into the dual openings 16 of the wall socket 18.

It will be understood from the foregoing description of known devices that the orientation of the docking port 12, relative to the housing member 10 and relative to the defined axis 24 of the prongs, results in a rechargeable device which is docked within the docking port 12 being extended outwardly from the housing member 10 in a direction perpendicular to the plane of the wall socket 18. So oriented, the rechargeable device is vulnerable to slipping out of the docking port 12 or being knocked out of the docking port 12 by a human or animal passing by the recharging device. Moreover, the sheer weight of the rechargeable device (not shown) is drawn downwardly, in the direction of arrow 24, by gravity, thereby resulting in either the rechargeable device being dislodged from the docking port 12 or the housing member 10 being dislodged from the wall socket 18.

The present invention is configured to overcome the problems encountered with known recharging devices as described above. Accordingly, in FIG. 2, a first embodiment of the present invention is shown in a representational manner to illustrate that the recharging device 30 is generally comprised of a housing 32 having a charging port 34. The charging port 34 is sized to receive an electronic appliance which is adapted for use in a cigarette lighter of an vehicle, as described more fully below. The recharging device 30 also includes a pair of prongs 36 (shown end-on) for insertion into the dual openings of an electrical socket or outlet. The charging port 34 of the present invention has a longitudinal axis 38 extending through the length thereof which is other than parallel to the defined axis 40 extending through the prongs 36. The defined axis 40 of the prongs 36 shown in FIG. 2 extends into the paper. In this particular embodiment, the longitudinal axis 38 of the charging port 34 is oriented radially to the defined axis 40 of the prongs 36 and the charging port 34 can be said to be vertically oriented. It can be seen, therefore, that when the prongs 36 of the recharging device 30 are inserted into an outlet, such as a wall outlet of the type shown in FIG. 1, the charging port 34 is oriented so that a rechargeable appliance positioned in the charging port 34 will be extend upwardly and along the wall, rather than outwardly where it can be dislodged from the recharging unit. It can also be seen that the orientation of the charging port 34 not only prevents the rechargeable appliance from being dislodged from the charging port 34, but the weight of the rechargeable appliance is directed along the longitudinal axis 38 of the charging port 34, which keeps the rechargeable appliance well secured within the charging port 34 and distributes the weight of the recharging device 30 along the plane of the wall socket. The recharging device 30 is, therefore, less vulnerable to falling out or being knocked out of the outlet or socket.

In a second embodiment of the invention, representationally shown in FIG. 3, the housing 32 of the recharging device 30 is configured with a charging port 34, having a longitudinal axis 38 which is oriented away from the defined axis 40 of the prongs 36, but which is more specifically oriented at an angle to the defined axis 40 of the prongs 36. The charging port 34 can be located anywhere relative to the housing 32 and at any degree of angle to the defined axis 40 of the prongs 36 while still providing an orientation which positions the rechargeable appliance (not shown) in a manner which redistributes its weight to limit or offset the effects of gravitational pull on the rechargeable appliance. The rechargeable appliance is, as a result, not vulnerable to falling out or being knocked out of the charging port 34 and the weight of the recharging device 30 and the rechargeable appliance maintain the recharging device 30 in the outlet.

One example of a commercial embodiment of the recharging device 30 of the present invention is shown in FIG. 4 where the housing 32 is further comprised of an upper housing member 46 and a lower housing member 48. The two parts of the housing 32 can be separated at seam 50 for access to the interior of the housing 32. The lower housing member 48 may have feet 52 for stable positioning of the housing 32 on a surface. The upper housing member 46 is ornamentally designed with a sloping face 54 such that the height of one end of the upper housing member 46 is greater than the other end. The sloping face 54 is further ornamentally configured with a beveled edge 56.

The charging port 34 is positioned through the sloping face 54 of the upper housing member 46 and, in this particular embodiment, is positioned proximate the lower end of the upper housing member 46, although the charging port 34 may be positioned anywhere along the sloping face 54. The charging port 34 is sized to receive the cylindrical post 58, or DC plug, of an electronic appliance 60 or an adapter device (e.g., charging adapter for a cell phone) which has been adapted to be received in and charged through the cigarette lighter of a vehicle.

An LED or other type of indicator light 62 may be positioned to extend through an aperture 64 formed in the upper housing member 46. Here, the aperture 64 is positioned along the beveled edge 56 of the upper housing member 46. The indicator light 62 may be provided to indicate when the electronic appliance 60 is properly positioned in the charging port 34 and is recharging. The light 62 may provide other or additional indications, such as a warning or alarm light.

Figure 6:
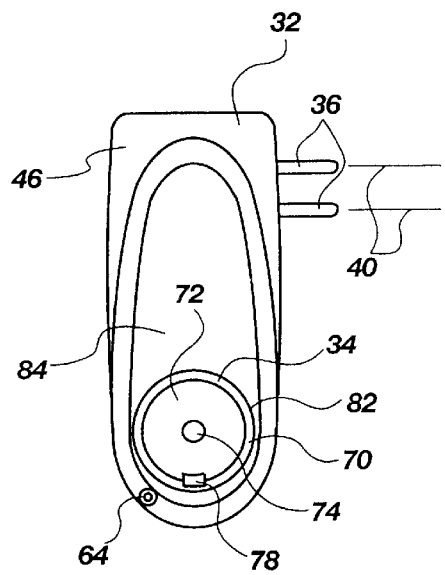
FIG. 6 is a plan view of the embodiment of the invention shown in FIG. 4.
Figure 5:
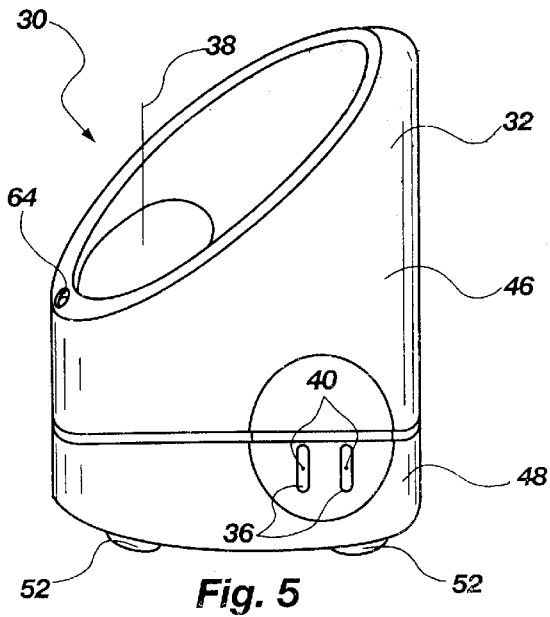
FIG. 5 is a perspective view of the embodiment of the invention shown in FIG. 4 illustrating a side of the recharging device which is positionable against a wall socket or other power source.
Figure 7:
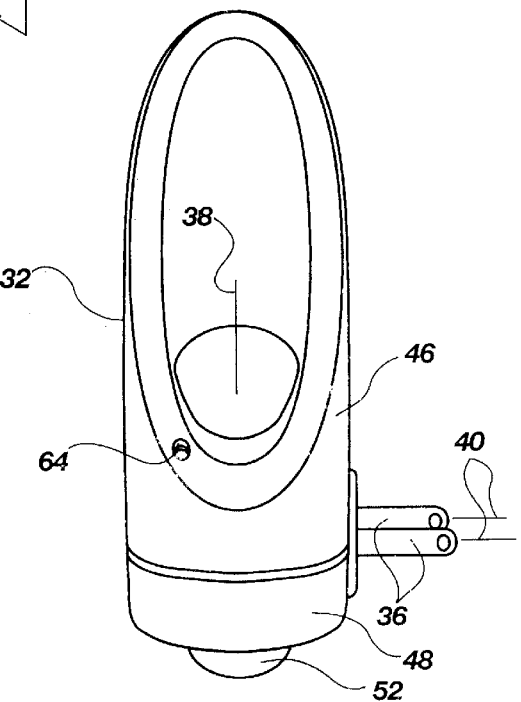
FIG. 7 is a view in elevation of the embodiment of the invention shown in FIG. 4, taken at line 7—7.

FIGS. 5, 6 and 7 further illustrate, that the housing is configured to accommodate a pair of prongs 36 which are positioned to be received in the dual openings of an electrical socket or wall outlet. As previously discussed, the prongs 36 may be said to have a defined axis 40 extending along the length of the prongs 36. It can be seen that the longitudinal axis 38 of the charging port 36 is radially-oriented, or perpendicular, to the defined axis 40 of the prongs 36. As shown more clearly in FIG. 6, the charging port 34 is a hollow cylindrical shaft formed in the upper housing member 46 of the recharging device 30. The charging port 34, therefore, has a continuous, cylindrical wall 70 and a bottom 72 in which is formed an opening 74 to receive the electrical pin 76 (FIG. 4) of the electronic appliance 60 or adapter device. An elongated slot 78 may be formed through the continuous cylindrical wall 70, in parallel orientation to the longitudinal axis 38, to receive the grounding contact 80 which extends from the circumferential surface of the cylindrical post 58 of the electronic appliance 60. The charging port 34 has an opening 82 which is formed through the solid surface 84 of the upper housing member 46. While the charging port 34 is illustrated as being cylindrical in shape, the charging port 34 may be any other suitable shape or geometry, such as square, oblong, hexagonal or the like.

Figure 8:
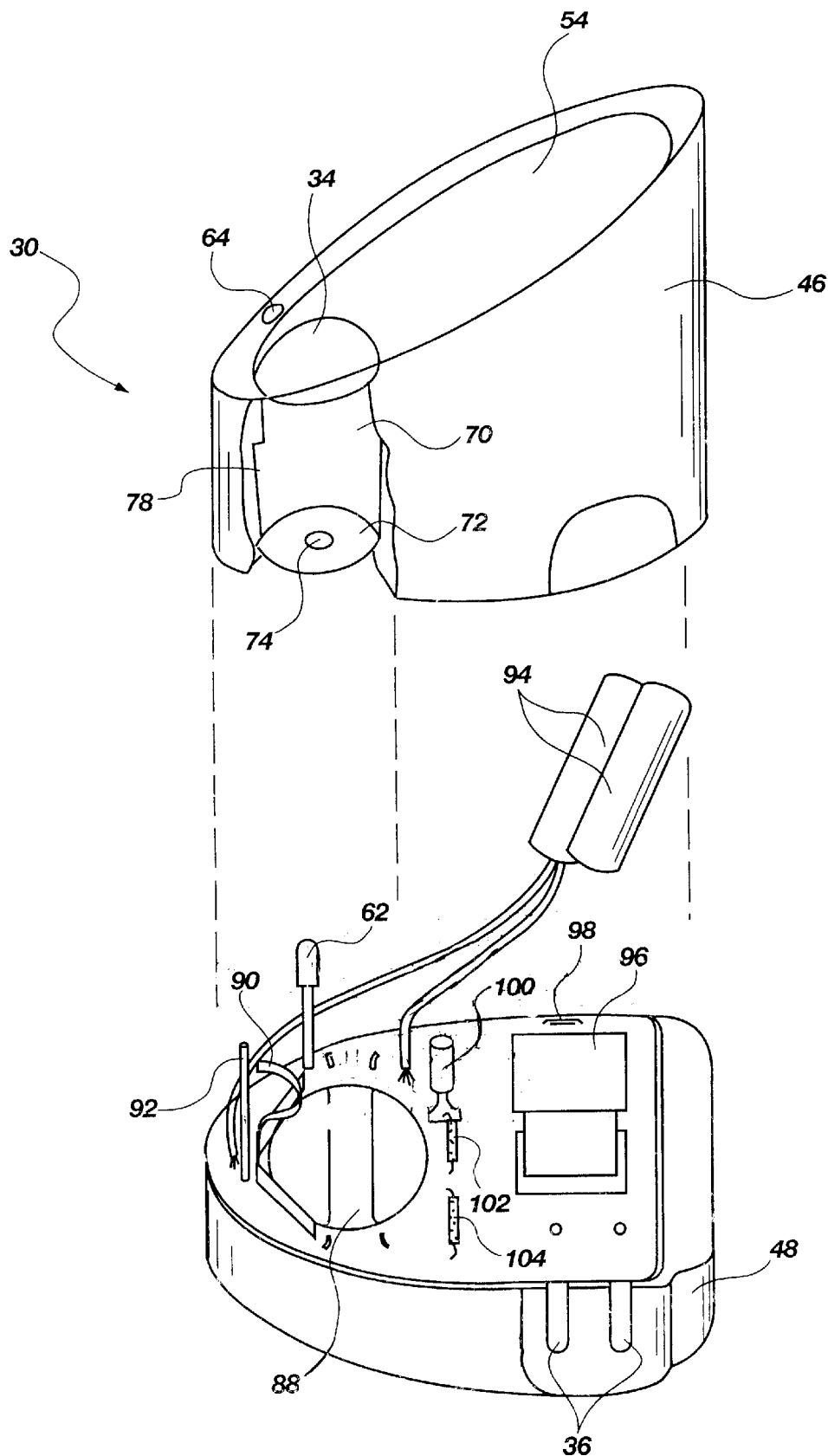
FIG. 8 is a partially exploded view of the invention illustrating one example of the circuitry positioned within the housing.

The housing 32 of the present invention provides an interior space within which to house the electronic circuitry of the device. The electronic circuitry may be any suitable system which provides power from an AC circuit to charge or recharge an electronic appliance positioned in the charging port 34. FIG. 8 illustrates but one example of electronic circuitry which may be employed in the recharging device 30 of the present invention and illustrates its general positioning in the interior of the housing 32.

Figure 9:
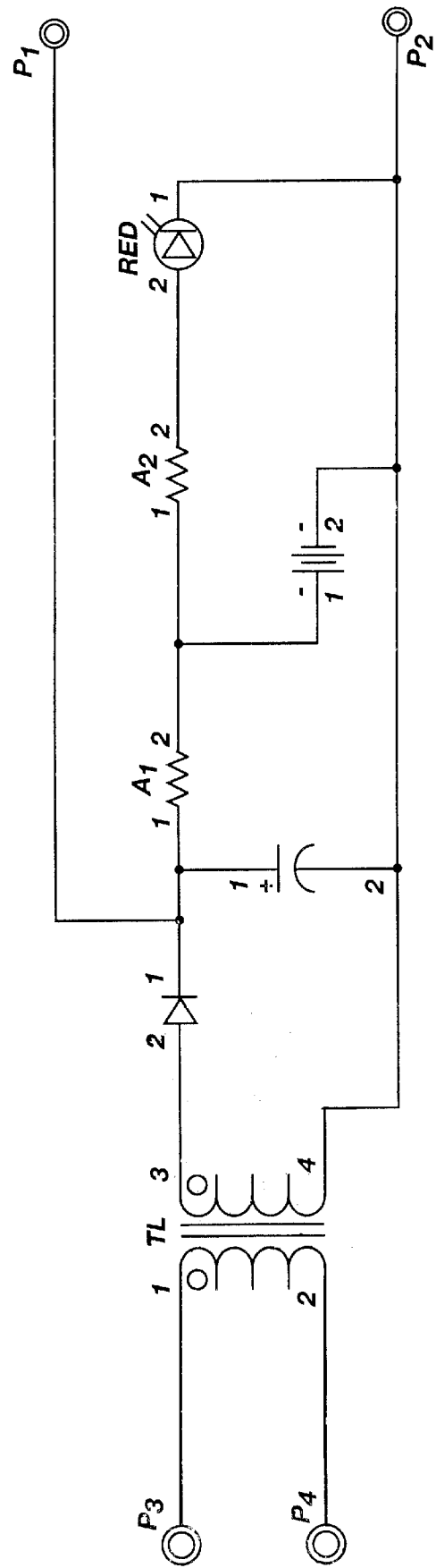
FIG. 9 is an exemplar wiring schematic of the present invention.

The upper housing member 46 is shown in FIG. 8 removed from the lower housing member 48. The upper housing member 46 is shown in partial breakaway to illustrate the configuration of the charging port 34, which has a continuous wall 70 and bottom 72 through which an aperture 74 is formed. As described previously, the electrical pin 76 (FIG. 4) of the electronic appliance 60 extends through the aperture 74 in the charging port 34. Thus, when the upper housing member 46 is in registration with the lower housing member 48, the pin 76 touches a positively charged contact plate 88. The grounding contact 80 (FIG. 4) of the electronic appliance 60 is aligned with slot 78 in the charging port 34 and registers with a negatively charged contact post 90. The contact post 90 is positioned proximate a switching post 92 which is contacted by contact post 90 when the grounding contact 80 registers against the contact post 90. The switching post energizes the battery pack 94 which comprises two 1.2V rechargeable batteries. In electrical communication with the prongs 36 is a transformer 96 having a 120V AC 60 Hz input capacity and an output of 10V and 50 mA. Also included in the illustrated circuitry system are a 500 mw, 100V switching diode 98, a 10 NF, 25V capacitor 100, a 360 Ohm resistor 102 and a 62 Ohm resistor 104. The circuitry also energizes the indicator light 62 to, for example, indicate when a docked electronic appliance is being charged. FIG. 9 provides a wiring diagram of the circuitry system illustrated in FIG. 8. Many other and different circuitry systems and wiring plans may be employed.

FIG. 10 illustrates the commercial embodiment of the present invention shown in FIGS. 4–8, but further demonstrates how the recharging device 30 can accommodate, for example, an electronic appliance 60 in the form of a flashlight 110. The flashlight 110 shown in FIG. 10 is ornamentally designed to mate with sloping face 54 of the ornamentally designed housing 32.

FIG. 11 illustrates that the housing 32 of the recharging device 30 may have any number of other designs or configurations. For example, FIG. 11 illustrates a housing 32 which has a non-sloping upper face 112 which can accommodate more conventionally designed flashlights 114 or other electronic appliances that have been adapted for insertion into a cigarette lighter of a vehicle.

It should further be noted that while the recharging device 30 has generally been illustrated herein as having an ornamental ovate shape in lateral cross section, the shape, size and dimension of the recharging device is virtually without limitation. It is only important that the longitudinal axis of the charging port be positioned at an orientation other than parallel to a defined axis of the prongs of the device, as defined herein. FIG. 12 further emphasizes that although the charging port 34 has been illustrated in FIGS. 4–8, depicting a commercial embodiment of the invention, as being vertically oriented, the charging port 34 may be positioned at any number of positions or angles within the housing, as illustrated in phantom in FIG. 12. The charging port 34 is also not required to open through the upper face 112 or sloping face 54 of the housing 32, but may open through the circumferential side 116 (FIG. 11) of the housing 32.

Figure 13:
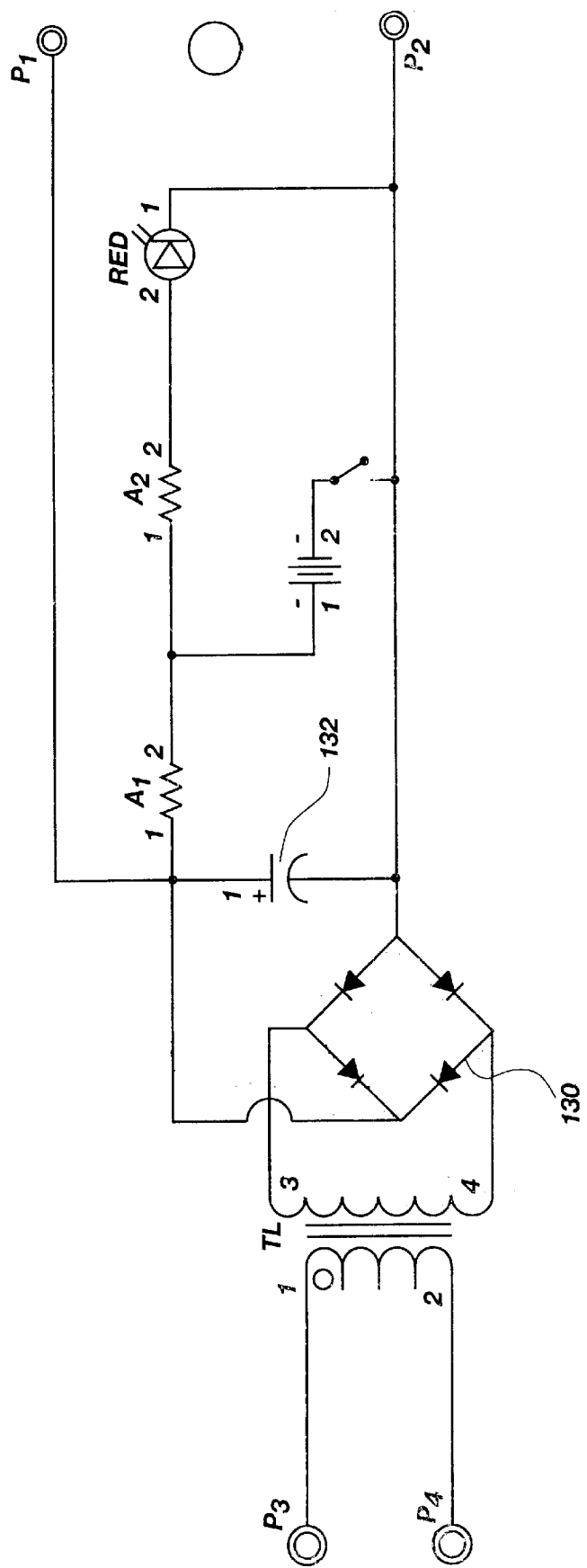
FIG. 13 is an alternative exemplar wiring schematic for the present invention having a 550 milliampere (mA) output suitable for charging larger appliances like cellular phones.

Although the present invention has been described heretofore as being suitable for recharging smaller appliances, such as a flashlight or shaver, the present invention may be configured and constructed to provide recharging capabilities to larger electronic appliances, such as cellular phones. FIG. 13 illustrates another exemplar wiring schematic for a larger output system, namely one having a 13v DC 500 mA output. The illustrated system includes a four diode bridge rectifier 130 and a 25 v capacitor 132. The present invention may be configured to provide upwards of 3000 nA of output and is not limited to the configurations and power output described specifically herein.

The charging/recharging device of the present invention is configured to receive an electronic appliance, which is adapted for receipt in the cigarette lighter of a vehicle, for charging or recharging via an AC power source. The charging/recharging device may be adapted in shape, size or dimension to retain any type of cigarette lighter-adapted appliance. Hence, reference herein to specific details of the illustrated embodiments is by way of example and not by way of limitation. It will be apparent to those skilled in the art that many modifications of the basic illustrated embodiments may be made without departing from the spirit and scope of the invention as recited by the claims.

What is claimed is:

1. An AC-powered charging/recharging device for charging electronic devices or their charging adapters which are adapted for insertion into the cigarette lighter of a vehicle, comprising:

a housing having an interior space;

an electrical circuitry system positioned within said interior space of said housing for converting AC power;

a pair of electrical prongs extending from said housing and being adapted for ID insertion in an electrical outlet source of AC power, said prongs having a defined axis extending through and along the length of said prongs; and a charging port sized to receive a cigarette lighter-adapted (DC) end of an electronic device and having a longitudinal axis extending through the length thereof, said longitudinal axis of said charging port being positioned in a non-parallel orientation relative to said defined axis of said prongs.

2. The charging/recharging device of claim 1 wherein said longitudinal axis of said charging port is oriented radially to said defined axis of said prongs.

3. The charging/recharging device of claim 1 wherein said longitudinal axis of said charging port is oriented at an angle to said defined axis of said prongs.

4. The charging/recharging device of claim 1 wherein said housing is further comprised of an upper housing member and a lower housing member which are separable to provide access to said interior space of said housing.

5. The charging/recharging device of claim 4-wherein said lower housing member is further configured with feet.

6. The charging/recharging device of claim further comprising an indicator light.

7. The charging/recharging device of claim 1 wherein said electrical circuitry system is configured to provide up to 3000 milliamperes of power output.

8. The charging/recharging device of claim 7 wherein said power output is 50 milliamperes.

9. The charging/recharging device of claim 7 wherein said power output is 500 milliamperes.

10. An AC-powered charging/recharging device for charging electronic devices or their charging adapters which are adapted for insertion into the cigarette lighter of a vehicle, comprising:

a housing having an interior space; an electrical circuitry system positioned within said interior space of said housing for converting AC power;

a pair of electrical prongs extending from said housing and being adapted for insertion in an electrical outlet source of AC power, said prongs having a defined axis extending through and along the length of said prongs; and a charging port sized to receive a cigarette lighter-adapted (DC) end of an electronic device and having a longitudinal axis extending through the length thereof, said longitudinal axis of said charging port being positioned in a non-parallel orientation relative to said defined axis of said prongs such that said charging port is positioned to maintain the center of gravity of said charging/recharging device.

11. The charging/recharging device of claim 10 wherein said longitudinal axis of said charging port is oriented radially to said defined axis of said prongs.

12. The charging/recharging device of claim 10 wherein said longitudinal axis of said charging port is oriented at an angle to said defined axis of said prongs.

13. An AC-powered charging/recharging device for charging electronic devices or their charging adapters which are adapted for insertion into the cigarette lighter of a vehicle, comprising:

a housing having an interior space;

an electrical circuitry system positioned within said interior space of said housing for converting AC power;

a pair of electrical prongs extending from said housing and being adapted for insertion in an electrical outlet source of AC power, said prongs having a defined axis extending through and along the length of said prongs; and a charging port sized to receive a cigarette lighter-adapted (DC) end of an electronic device, said charging port having a longitudinal axis extending through the length thereof and being positioned in a non-parallel orientation relative to said defined axis of said prongs to limit the profile of said charging/recharging device defined in a direction extending away from said electrical prongs.

14. The charging/recharging device of claim 13 wherein said longitudinal axis of said charging port is oriented radially to said defined axis of said prongs.

15. The charging/recharging device of claim 13 wherein said longitudinal axis of said charging port is oriented at an angle to said defined axis of said prongs.

* * * * *